(12) United States Patent
Wilkosz et al.

(10) Patent No.: US 12,041,055 B2
(45) Date of Patent: Jul. 16, 2024

(54) METHOD AND APPARATUS FOR PREVENTING ACCESS TO AN IOT DEVICE

(71) Applicant: MOTOROLA SOLUTIONS, INC., Chicago, IL (US)

(72) Inventors: Pawel Wilkosz, Wisniowa (PL); Grzegorz Gustof, Myslenice (PL); Pawel Niemiec, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 147 days.

(21) Appl. No.: 17/777,093

(22) PCT Filed: Mar. 27, 2020

(86) PCT No.: PCT/PL2020/050024
§ 371 (c)(1),
(2) Date: May 16, 2022

(87) PCT Pub. No.: WO2021/194362
PCT Pub. Date: Sep. 30, 2021

(65) Prior Publication Data
US 2023/0007006 A1  Jan. 5, 2023

(51) Int. Cl.
*H04L 9/40* (2022.01)
*H04W 24/08* (2009.01)
*G16Y 30/10* (2020.01)

(52) U.S. Cl.
CPC ........ *H04L 63/102* (2013.01); *H04L 63/1441* (2013.01); *G16Y 30/10* (2020.01)

(58) Field of Classification Search
CPC .......................... H04L 63/102; H04L 63/1441
USPC .................................................... 726/22
See application file for complete search history.

(56) References Cited

U.S. PATENT DOCUMENTS

| 7,197,049 | B2 | 3/2007 | Engstrom et al. |
| 9,094,407 | B1 | 7/2015 | Matthieu et al. |
| 9,325,737 | B2 | 4/2016 | Gutowski et al. |
| 9,900,171 | B2 | 2/2018 | Guedalia et al. |
| 11,283,881 | B1* | 3/2022 | Nanda ............... H04L 67/12 |
| 11,481,509 | B1* | 10/2022 | Prasad ............ G06F 16/24564 |
| 11,483,339 | B1* | 10/2022 | Kaimal ............. H04L 63/1416 |
| 2009/0006469 | A1 | 1/2009 | Jain et al. |

(Continued)

FOREIGN PATENT DOCUMENTS

| JP | 6367840 B2 | 8/2018 |
| KR | 20150121126 A | 10/2015 |

(Continued)

OTHER PUBLICATIONS

The International Search Report and the Written Opinion, corresponding patent application No. PCT/PL2020/050024 filed: Mar. 27, 2020, all pages.

*Primary Examiner* — Haresh N Patel
(74) *Attorney, Agent, or Firm* — Daniel R Bestor

(57) ABSTRACT

A method and apparatus for preventing access to an IoT device is provided herein. During operation an apparatus will inquire about current and/or past connections to an IoT device. A list of identities of current and/or past apparatuses that were connected to the IoT device will be provided, and a determination on whether or not to allow access to the IoT device will be based on the identities of current and/or past apparatuses that are accessing, or have accessed the IoT device.

6 Claims, 3 Drawing Sheets

(56) References Cited

U.S. PATENT DOCUMENTS

| | | | |
|---|---|---|---|
| 2017/0208057 A1* | 7/2017 | Wang | H04L 63/083 |
| 2018/0013761 A1* | 1/2018 | Bachar | H04L 67/303 |
| 2018/0288617 A1* | 10/2018 | Robison | H04L 63/08 |
| 2019/0098089 A1* | 3/2019 | Shim | H04L 67/565 |
| 2019/0173955 A1* | 6/2019 | Bachar | H04L 67/303 |
| 2019/0289069 A1* | 9/2019 | Cano Zapata | H04W 4/06 |
| 2019/0349762 A1* | 11/2019 | Bang | H04L 9/0897 |
| 2019/0386880 A1* | 12/2019 | Dhanabalan | H04L 61/2553 |
| 2020/0106841 A1* | 4/2020 | Delaney | H04L 67/535 |
| 2020/0112610 A1* | 4/2020 | Arnberg | H04W 12/06 |
| 2020/0195508 A1* | 6/2020 | Benjamin | H04L 63/20 |

FOREIGN PATENT DOCUMENTS

| | | | | |
|---|---|---|---|---|
| KR | 20200063354 A | * | 6/2020 | |
| TW | I738708 B | * | 9/2021 | |
| WO | 2018116123 A1 | | 6/2018 | |
| WO | WO-2018227695 A1 | * | 12/2018 | H04L 67/1097 |
| WO | WO2019055218 A1 | | 3/2019 | |

* cited by examiner

METHOD AND APPARATUS FOR PREVENTING ACCESS TO AN IOT DEVICE

BACKGROUND OF THE INVENTION

The Internet of Things (IoT) refers to the connection of every-day devices to the Internet. Devices such as cameras, kitchen appliances, medical devices, doors, windows, HVAC systems, drones, . . . , etc. can all be connected through the IoT. Basically, anything that can be powered can be connected to the internet to control its functionality. The IoT allows objects to be sensed and controlled remotely across existing network infrastructure, creating opportunities for more direct integration of the physical world into computer-based systems, and resulting in improved efficiency, accuracy, and control.

IoT devices can help a public-safety officer in crime investigation since IoT sensors can monitor a crime scene with devices such as video cameras, motion detectors, sound recorders, environmental monitors, etc. Since a criminal may try to connect to IoT devices to remove evidence or serve false information to any connected public-safety device, it would be beneficial to stop a public-safety officer's device from transferring data to/from IoT devices in situations where the IoT device may provide false evidence.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
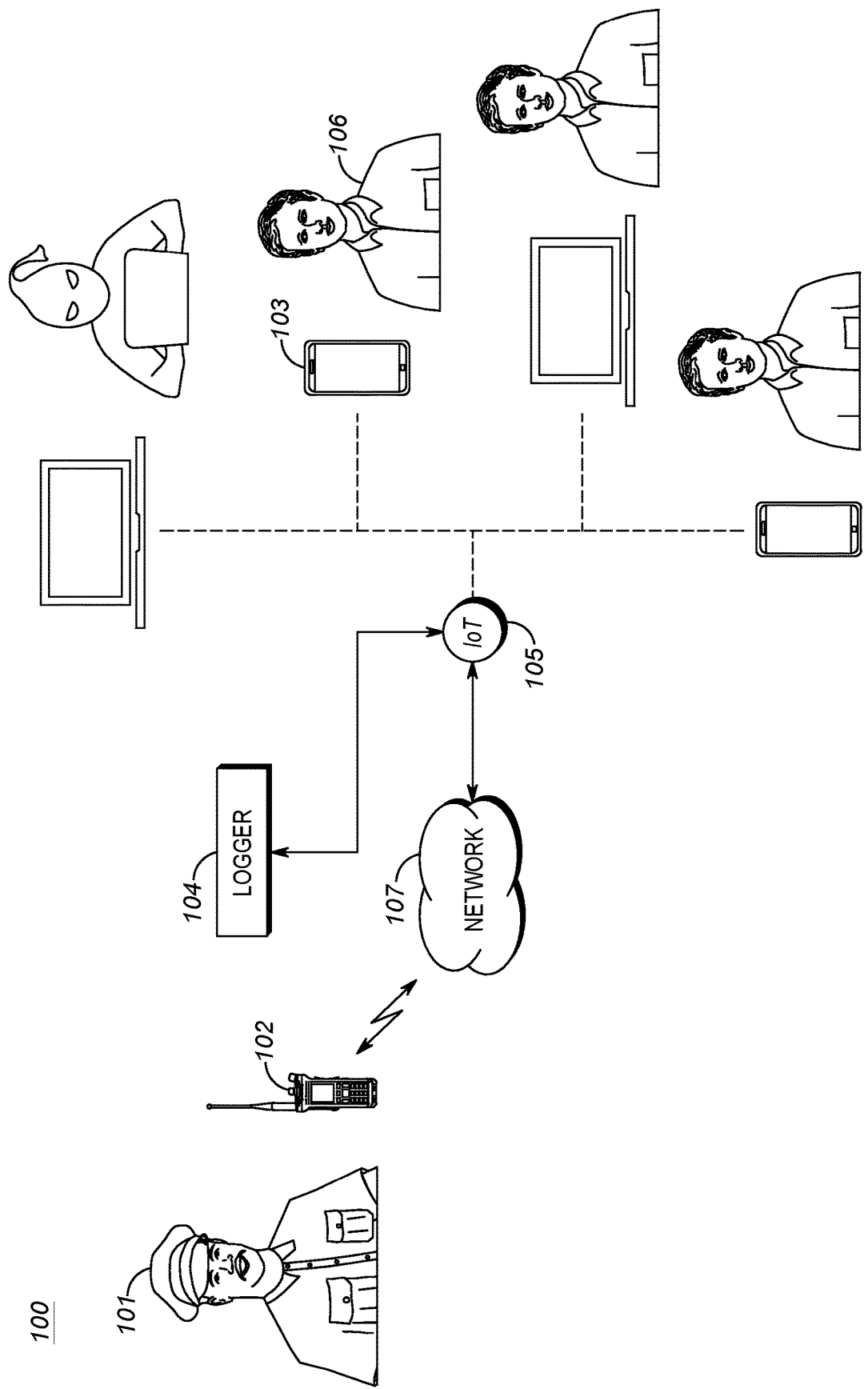
FIG. 1 is a block diagram of an IoT ecosystem.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for preventing access to an IoT device is provided herein. During operation an apparatus will inquire about current and/or past connections to an IoT device. A list of identities of current and/or past apparatuses that were connected to the IoT device will be provided, and a determination on whether or not to allow access to the IoT device will be based on the identities of current and/or past apparatuses that are accessing, or have accessed the IoT device.

Consider the following example: An officer was involved in a foot chase with a suspect. After an unsuccessful chase, the officer wants to provide a nearby IoT camera with data about the suspect to enable recognition of the suspect in the future. The officer connects an apparatus to the IoT camera, however, before transmitting the data to the IoT camera, the IoT camera will provide the apparatus with a list of devices that are currently connected to the IoT camera. If the devices currently connected to the IoT camera are all recognized as known safe devices, then data will be transmitted to the IoT camera. However, if unknown (or known malicious) devices are currently connected to the IoT camera, then the apparatus will prevent itself from transmitting any data to the IoT camera. Preventing the transmission of data will prevent unwanted individuals from being able to access the data.

In an alternate embodiment of the present invention if unknown (or known malicious) devices are currently connected to the IoT camera, then the apparatus will prevent itself from transmitting any unencrypted data to the IoT camera. Preventing the transmission of unencrypted data will prevent unwanted individuals from being able to access the data.

In another example, consider the following: An officer is currently chasing a suspect. After a successful chase, the officer wants to access a nearby IoT camera and retrieve a video of the apprehension. The officer connects an apparatus to the IoT camera, however, before retrieving the video of the apprehension, the IoT camera will provide the apparatus with a list of devices that are currently connected to the IoT camera and a list of devices that have connected to the IoT camera within the recent past (e.g., since the apprehension has taken place). If the devices currently connected to the IoT camera and the devices that have connected to the IoT camera within the recent past are all recognized as known safe devices, then data will be retrieved from the IoT camera. However, if unknown (or known malicious) devices are currently connected, or have recently connected to the IoT camera since the apprehension, then the apparatus will prevent itself from receiving any data to the IoT camera. This prevents the apparatus from retrieving potentially corrupt images and video placed there nefariously.

FIG. 1 is a block diagram of IoT ecosystem 100. As shown, officer 101 is provided with apparatus 102 that accesses IoT device 105 through network 107. Apparatus 102 may comprise any suitable computing and/or communication devices configured to engage in wireless communication over an air interface as is known to those in the relevant art. For example, apparatus 102 may comprise a mobile device running an Android™ or iOS™ operating system.

Apparatus 102 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-tomultipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

Communication between apparatus 102 and IoT device 105 takes place through intervening network 107 such as, but not limited to a high-speed data network 107 such as a cellular communication system and/or public-safety core network and radio access network. IoT device 105 comprises any device, sensor, camera, video cameras, motion detectors, sound recorders, environmental monitors . . . , etc. that can be accessed and/or controlled via apparatus 102 via communications through intervening network 107.

As shown in FIG. 1, users 106 of other devices 103 (only one user and other device labelled in FIG. 1) may access and/or control IoT device 105. This control may be through other intervening networks (not shown) or through network 107.

Finally, although not necessary, ecosystem 100 may comprise logger 104 that serves to log identities of those individuals accessing and/or controlling IoT device 105. Although logger 104 is shown connected to only IoT device 105, one of ordinary skill in the art will recognize that logger 104 may be connected to many IoT devices, logging information on those who access to IoT devices.

During operation, apparatus 102 connects to IoT device 105. As part of the connection process, apparatus 102 is provided with information on the identities of people that are using the IoT device at the particular moment, and/or identities of people that have used the IoT device in the past. (Apparatus 102 may provide a timeframe to IoT device 105 when determining past IoT users of device 105, for example, a period of time, that the IoT device will use for determining past users).

In response to the connection of apparatus 102 to IoT device 105, apparatus 102 is provided with information on current users and/or recent users of IoT device 105. In order to provide this information to apparatus 102, IoT device 105 may access logger 104 to determine this information, and pass this information to apparatus 102. The information about current and past users may comprise any information that will help in identifying the current and recent users of IoT device 105. For example, in one embodiment, a Media Access Control (MAC) address of current and past users may be provided in order to identify particular devices 103. Apparatus 102 may access an internal or an external database of known MAC addresses to determine whether or not the device is unknown, or known malicious. By comparing the MAC addresses provided by IoT devices 105 to those stored in a database (internal or external), apparatus 102 may learn the identities and prevent data transfer to and from IoT device 105 if known malicious persons have accessed IoT device 105, or if unknown persons have accessed IoT device 105.

Alternatively, in another embodiment, voice recordings or images of those current or past users may also be provided to apparatus 102. For example, if IoT device 105 comprises a microphone, a recording of persons accessing IoT device 105 may be provided to apparatus 102. Similarly, if IoT device 105 comprises a camera, a video or photograph or video may be provided to apparatus 102. Once a voice recording, photo, or video has been obtained by apparatus 102, it will be up to apparatus 102 to identify whether or not the users 106 of devices 103 are either unknown, or malicious. Again, this may be accomplished by apparatus 102 accessing a database of known voice signatures and/or images of individuals. By comparing the voice recording and/or images of the users provided by IoT devices 105 to those stored in a database (internal or external), apparatus 102 may learn the identities and prevent data transfer to and from IoT device 105 if known malicious persons have accessed IoT device 105, or if unknown persons have accessed IoT device 105.

Figure 2:
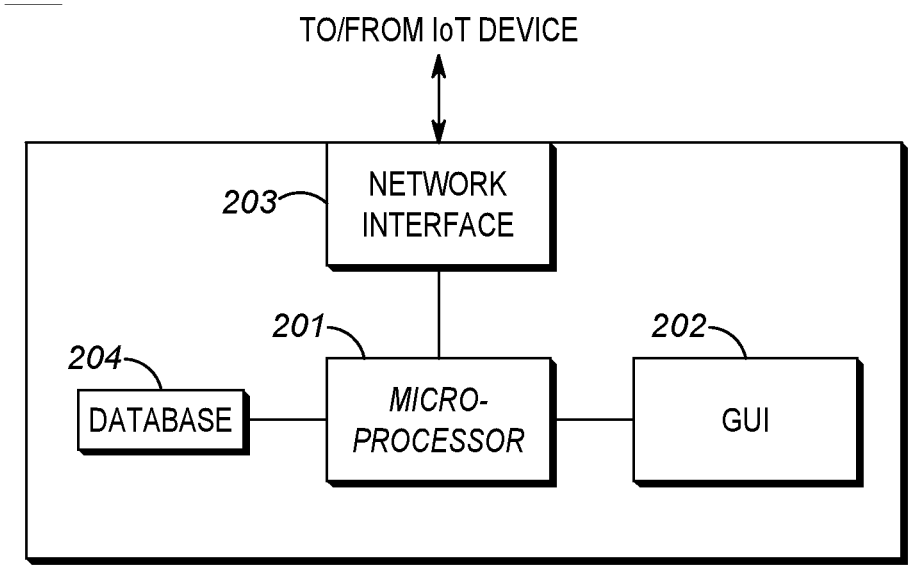
FIG. 2 is a block diagram of an apparatus designed to access an IoT device.

FIG. 2 is a block diagram of an apparatus designed to access an IoT device. In an embodiment, apparatus 102 is embodied within a police radio, however in alternate embodiments the device may be embodied within the public-safety core network, dispatch center, or more computing devices in a cloud compute cluster (not shown), or some other communication device not illustrated in FIG. 2, and/or may be a distributed communication device across two or more entities.

As shown, apparatus 102 comprises network interface 203, which may comprise a Wide-Area-Network (WAN) transceiver, database 204, logic circuitry 201, and graphical-user interface (GUI) 202. In other implementations, apparatus 102 may include more, fewer, or different components. All components are connected via common data busses as known in the art.

Network interface 203 may comprise well known long-range transceivers that utilize any number of network system protocols. (As one of ordinary skill in the art will recognize, a transceiver comprises both a transmitter and a receiver for transmitting and receiving data). For example, network interface 203 may be operable to utilize a next-generation cellular communications protocol operated by a cellular service provider, or any public-safety protocol such as an APCO 25 network or the FirstNet broadband network.

In alternate embodiments of the present invention, network interface 203 may comprise a wired connection to network 107. If this is the case, then network interface 203 provides processing, modulating, and transceiver elements that are operable in accordance with any one or more standard or proprietary wireless interfaces, wherein some of the functionality of the processing, modulating, and transceiver elements may be performed by means of the logic circuitry 201 through programmed logic such as software. Examples of network interfaces (wired or wireless) include Ethernet, T1, USB interfaces, IEEE 802.11b, IEEE 802.11g, etc.

Logic circuitry 201 comprises a digital signal processor (DSP), general purpose microprocessor, a programmable logic device, or application specific integrated circuit (ASIC) and is operable to receive information on identities of devices that have connected to IoT device 105 within a particular time period, and/or the identities of devices that are currently connected to IoT device 105. Logic circuitry 201 also prevents data transmission to/from IoT device 105, or alternatively prevents unencrypted transmissions to IoT device 105 when unknown or untrusted devices have connected to IoT device 105 in the recent past, or when unknown or untrusted devices are currently connected to IoT device 105.

GUI 202 provides a man/machine interface for receiving an input from a user and displaying information. For example, GUI 202 may provide a way of receiving a time period from a user. The time period received by GUI 202 may be provided to IoT device 105 so that IoT device may provide a list of user information on those users who have accessed IoT device within the time period. For example, GUI may receive a time period of 1 hour, and this may be provided to IoT device 105. IoT device will then return those users who have accessed IoT device 105 within the last hour. With the above in mind, GUI 202 may comprise any combination of a touch screen, a computer screen, a keyboard, or any other interface needed to receive a user input and provide information to the user.

Database 204 is provided. Database 102 comprises standard memory (such as RAM, ROM, . . . , etc) and serves to store information used to identify known users, whether a user is unknown, and/or whether or not a user is malicious. For example, database 204 may store a list of known "friendly" MAC addresses or known "high risk" MAC addresses. Any MAC address received from IoT device 105 may be compared to database 204 to determine if the MAC address is from a "friendly" device. In a similar manner, database 102 may comprise voice prints or images of known friendly or high-risk individuals. Any image or voice recording received from IoT device 105 may be compared to those within database 102 to determine friendly or high-risk devices are accessing, or have accessed IoT device 105.

With the above in mind, FIG. 2 provides for an apparatus comprising a network interface configured to access an Internet of Things (IoT) device, and a database configured to store information used to identify if an individual accessing the IoT device is friendly, malicious, or unknown. Logic circuitry is provided that is configured to access the IoT device to receive information on users currently accessing the IoT device, access the database to determine if those users currently accessing the IoT device are friendly, malicious, or unknown, and prevent transferring data or unencrypted data to and from the IoT device when at least one individual accessing the IoT device is malicious or unknown.

As discussed above, logic circuitry 201 can also prevent access to IoT device 105 if an unknown or malicious user has accessed to IoT device 105 within the recent past. When this is the case, apparatus 102 comprises a graphical-user interface (GUI) receiving a time period from a user. The network interface is also configured to provide the time period to the IoT device. The logic circuitry is also configured to access the IoT device to determine information on users that have accessed the IoT device within the time period, access the database to determine if those users that have accessed the IoT device within the time period are friendly, malicious, or unknown, and prevent transferring data or unencrypted data to and from the IoT device when those users that have accessed the IoT device within the time period are malicious or unknown.

Figure 3:
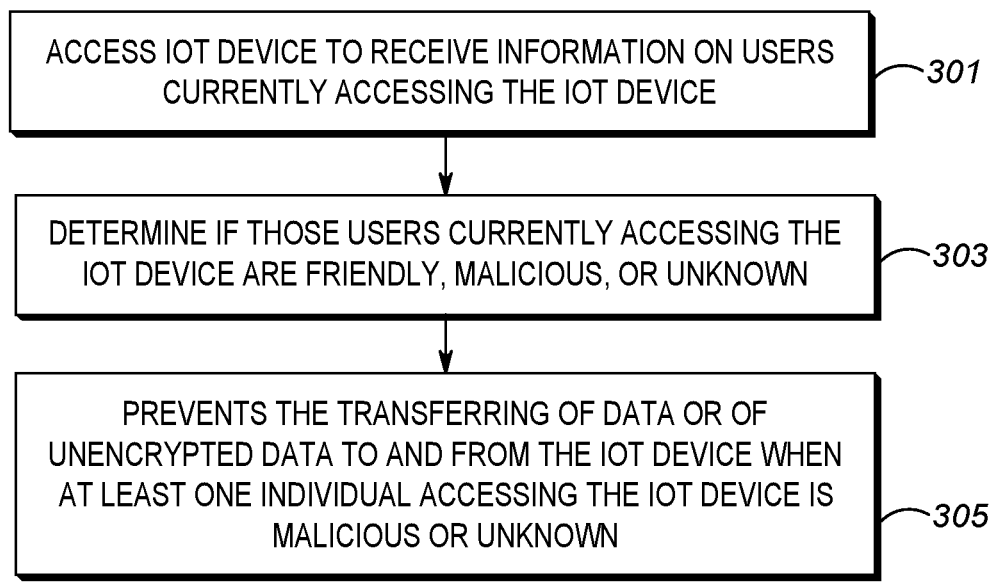
FIG. 3 is a flow chart showing operation of the apparatus of FIG. 2.

As discussed, the time period comprises a time period since a public-safety incident or event has occurred FIG. 3 is a flow chart showing operation of the apparatus of FIG. 2. The logic flow begins at step 301 where logic circuitry 201 instructs network interface 205 to access IoT device 105 to receive information on users currently accessing the IoT device 105. At step 303, logic circuitry 201 accesses database 204 to determine if those users currently accessing the IoT device are friendly, malicious, or unknown. Finally, at step 305, logic circuitry 201 prevents the transferring of data or of unencrypted data to and from the IoT device when at least one individual accessing the IoT device is malicious or unknown.

Figure 4:
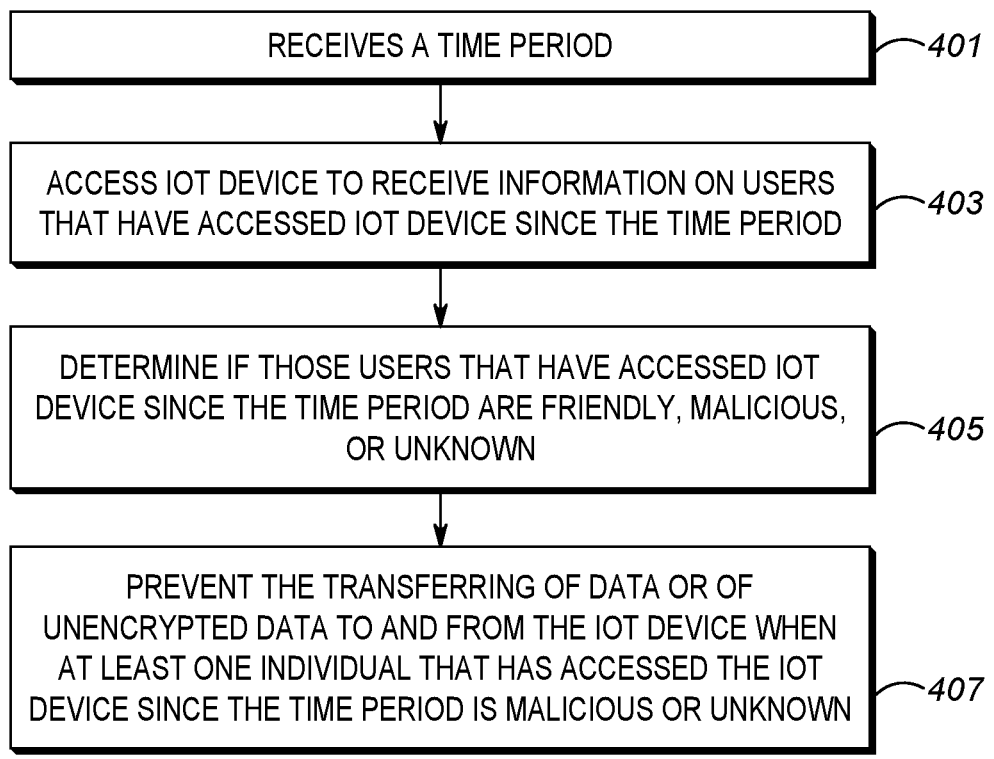
FIG. 4 is a flow chart showing operation of the apparatus of FIG. 2.

FIG. 4 is a flow chart showing operation of the apparatus of FIG. 2 in an alternate embodiment of the present invention. The logic flow begins at step 401 where logic circuitry 201 receives a time period from GUI 202. At step 403, logic circuitry 201 instructs network interface 205 to access IoT device 105 to receive information on users that have accessed IoT device 105 since the time period. At step 405, logic circuitry 201 accesses database 204 to determine if those users that have accessed IoT device 105 since the time period are friendly, malicious, or unknown. Finally, at step 407, logic circuitry 201 prevents the transferring of data or of unencrypted data to and from the IoT device when at least one individual that has accessed the IoT device since the time period is malicious or unknown.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a database;
a graphical-user interface (GUI) receiving a time period from a user;
a network interface configured to provide the time period to an IoT device;
logic circuitry is configured to:
    access the IoT device to determine information on users that have accessed the IoT device within the time period;
    access the database to determine whether the users that have accessed the IOT device within the time period are friendly, malicious, or unknown; and
    prevent transferring data or unencrypted data to and from the IoT device when the users that have accessed the IoT device within the time period are malicious or unknown.

2. The apparatus of claim 1 wherein:
logic circuitry is also configured to:
    access the IoT device to receive information on users currently accessing the IoT device;
    access the database to determine whether the users currently accessing the IoT device are friendly, malicious, or unknown; and
    prevent transferring data or unencrypted data to and from the IoT device when at least one individual accessing the IoT device is malicious or unknown.

3. The apparatus of claim 2 wherein the time period comprises a time period since a public-safety event has occurred.

4. A method comprising the steps of:
accessing an IoT device to determine information on users that have accessed the IoT device within a predetermined time period;
accessing a database to determine whether the users that have accessed the IoT device within the time period are friendly, malicious, or unknown; and
preventing transferring data or unencrypted data to and from the IoT device when the users that have accessed the IoT device within the time period are malicious or unknown.

5. The method of claim 4 wherein the time period comprises a time period since a public-safety incident has occurred.

6. The method of claim 4 further comprising the step of receiving the time period via a graphical user interface (GUI).

* * * * *